Figure 1:
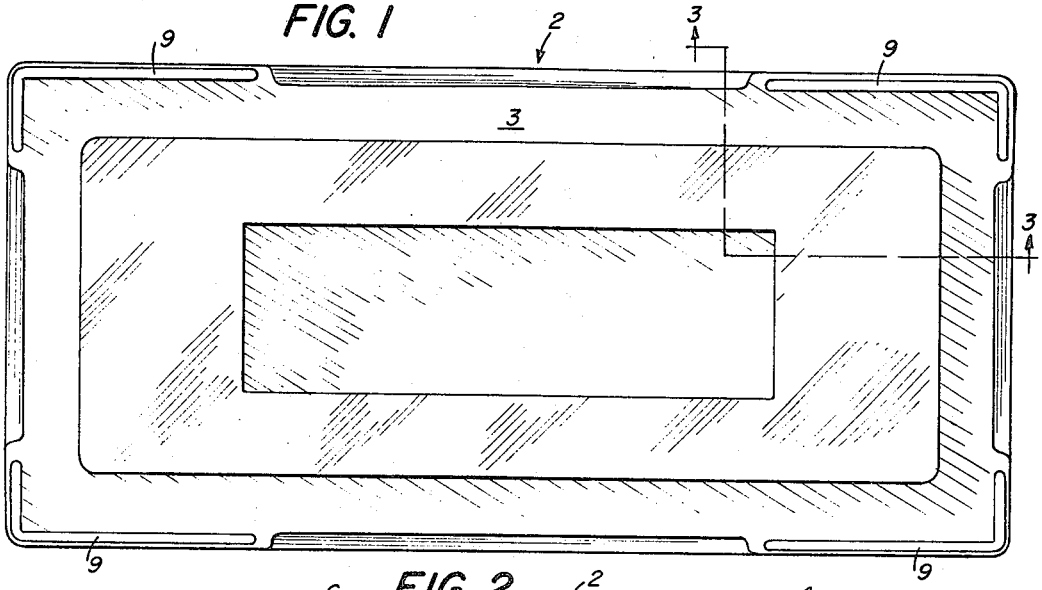
Figure 2:
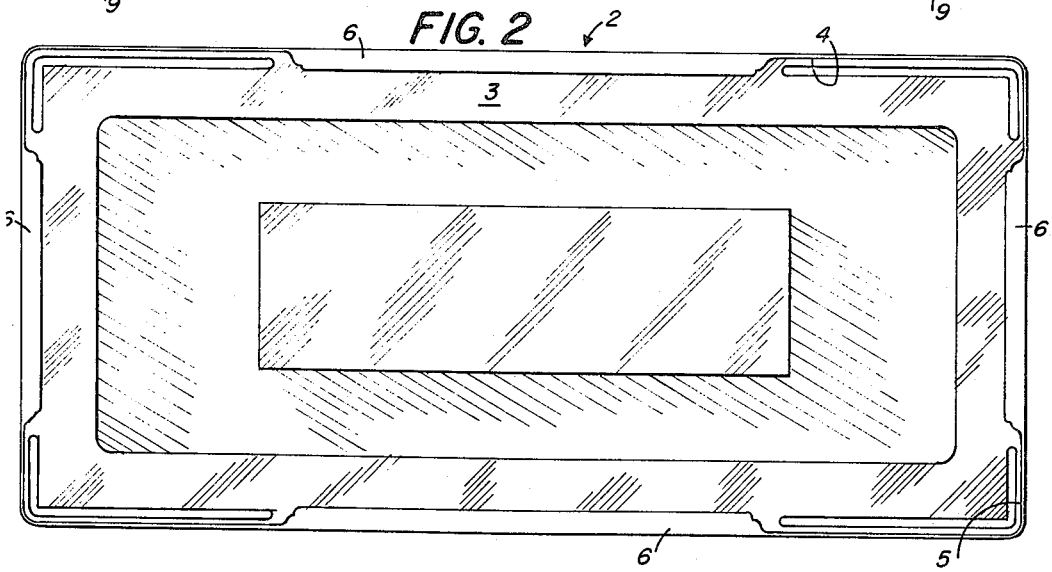
Figure 3:
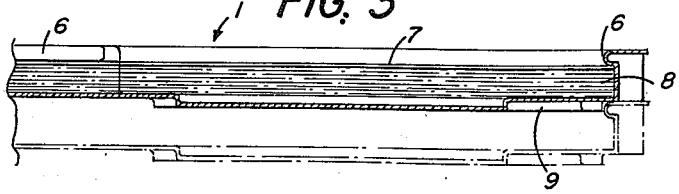

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 7, 1970

873 O.G. 17

T873,002

PACKAGE FOR SMALL SETS OF MICROFICHE

Adrian C. Runions, Rochester, and Arthur C. Rissberger, Jr., Webster, N.Y. (both of 1669 Lake Ave., Rochester, N.Y. 14650)

Filed Feb. 3, 1969, Ser. No. 796,096
Int. Cl. B65d *21/02, 71/00*
U.S. Cl. 220—97
1 Sheet Drawing. 6 Pages Specification

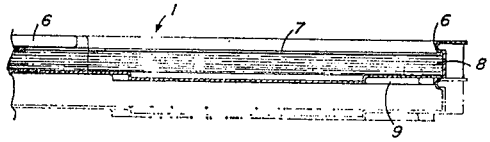

A package for microfiche. The package includes a tray having a generally rectangular base panel and side and end walls extending from the edges of the base panel at generally right angles thereto. The tray receives a stack of microfiche and a rigid cover panel. Locking flanges on the upper marginal edges of the side and end walls of the tray overlie the marginal edges of the cover panel to hold the panel and microfiche securely in the tray. The tray also has ridges at the corners of the base panel. These ridges serve to interlock adjacent packages when they are stacked on top of each other. The entire tray is made of plastic sheet which is thermoformed to the desired tray configuration. The base panel is dimensioned so that the corners of the microfiche are spaced from the juncture of side and end walls. This arrangement protects the corners of the microfiche should the package be dropped or impacted.

April 7, 1970 A. C. RUNIONS ET AL T873,002

PACKAGE FOR SMALL SETS OF MICROFICHE

Filed Feb. 3, 1969

ADRIAN C. RUNIONS
ARTHUR C. RISSBERGER
INVENTORS

BY Walter O. Hodsdon
William E. Jackson
ATTORNEY & AGENT